(12) United States Patent
Prakash et al.

(10) Patent No.: US 11,620,407 B2
(45) Date of Patent: Apr. 4, 2023

(54) REAL-TIME, CONTEXT BASED DETECTION AND CLASSIFICATION OF DATA

(71) Applicant: INTERNATIONAL BUSINESS MACHINES CORPORATION, Armonk, NY (US)

(72) Inventors: Sheeba Prakash, New City, NY (US); Amir Khan, Brookfield, CT (US); Grant Miller, Arvada, CO (US); Nader Nassar, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 680 days.

(21) Appl. No.: 16/656,306

(22) Filed: Oct. 17, 2019

(65) Prior Publication Data
US 2021/0117571 A1   Apr. 22, 2021

(51) Int. Cl.
| | | |
|---|---|---|
| *G06F 21/62* | (2013.01) | |
| *G06N 20/00* | (2019.01) | |
| *G06F 16/35* | (2019.01) | |
| *G06F 16/28* | (2019.01) | |

(52) U.S. Cl.
CPC ........ *G06F 21/6254* (2013.01); *G06F 16/285* (2019.01); *G06F 16/35* (2019.01); *G06F 21/6227* (2013.01); *G06N 20/00* (2019.01)

(58) Field of Classification Search
CPC ............ G06F 21/6254; G06F 21/6227; G06F 16/285; G06F 16/35; G06N 20/00
See application file for complete search history.

(56) References Cited

U.S. PATENT DOCUMENTS

| | | |
|---|---|---|
| 5,805,820 A | 9/1998 | Bellovin et al. |
| 6,044,466 A | 3/2000 | Anand et al. |
| 7,689,524 B2 | 3/2010 | Ozzie et al. |
| 7,912,700 B2 | 3/2011 | Bower et al. |
| 8,010,478 B2 | 8/2011 | Lim et al. |
| 8,266,082 B2 | 9/2012 | Lu et al. |
| 8,726,019 B2 | 5/2014 | Paddon et al. |
| 9,223,987 B2 | 12/2015 | Yoshihama |
| 2006/0123462 A1 | 6/2006 | Lunt et al. |
| 2008/0222142 A1 | 9/2008 | O"Donnell |
| 2010/0125605 A1 | 5/2010 | Nair et al. |
| 2016/0292445 A1 | 10/2016 | Lindemann |
| 2020/0021620 A1* | 1/2020 | Purathepparambil ........................ H04L 63/102 |
| 2020/0111023 A1* | 4/2020 | Pondicherry Murugappan ........... G06Q 10/0631 |
| 2020/0296186 A1* | 9/2020 | Lau ........................ H04L 67/75 |

* cited by examiner

*Primary Examiner* — Hee K Song
(74) *Attorney, Agent, or Firm* — Griffiths & Seaton PLLC

(57) ABSTRACT

Various embodiments are provided for providing real-time context-based detection and classification of data in a computing environment are provided. Data may be received from a user. Contextual information may be learned from the data received from a user using a machine learning operation. The data may be classified according to the contextual classification criteria applied to contextual information derived in real time from the data.

20 Claims, 11 Drawing Sheets

REAL-TIME, CONTEXT BASED DETECTION AND CLASSIFICATION OF DATA

BACKGROUND OF THE INVENTION

Field of the Invention

The present invention relates in general to computing systems, and more particularly to, various embodiments for providing real-time context-based detection and classification of data in a computing environment.

Description of the Related Art

In today's interconnected and complex society, computers and computer-driven equipment are more commonplace. Processing devices, with the advent and further miniaturization of integrated circuits, have made it possible to be integrated into a wide variety of devices. The advent of computers and networking technologies have made possible the intercommunication of people from one side of the world to the other. However, ensuring data integrity and security are a continuous challenge to address.

SUMMARY OF THE INVENTION

Various embodiments for providing real-time context-based detection and classification of data in a computing environment are provided. In one embodiment, by way of example only, a method for preserving data security in a shared computing file system, by a processor, is provided. Data may be received from a user. Contextual information may be learned from the data received from a user using a machine learning operation. The data may be classified according to the contextual classification criteria applied to contextual information derived in real time from the data.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
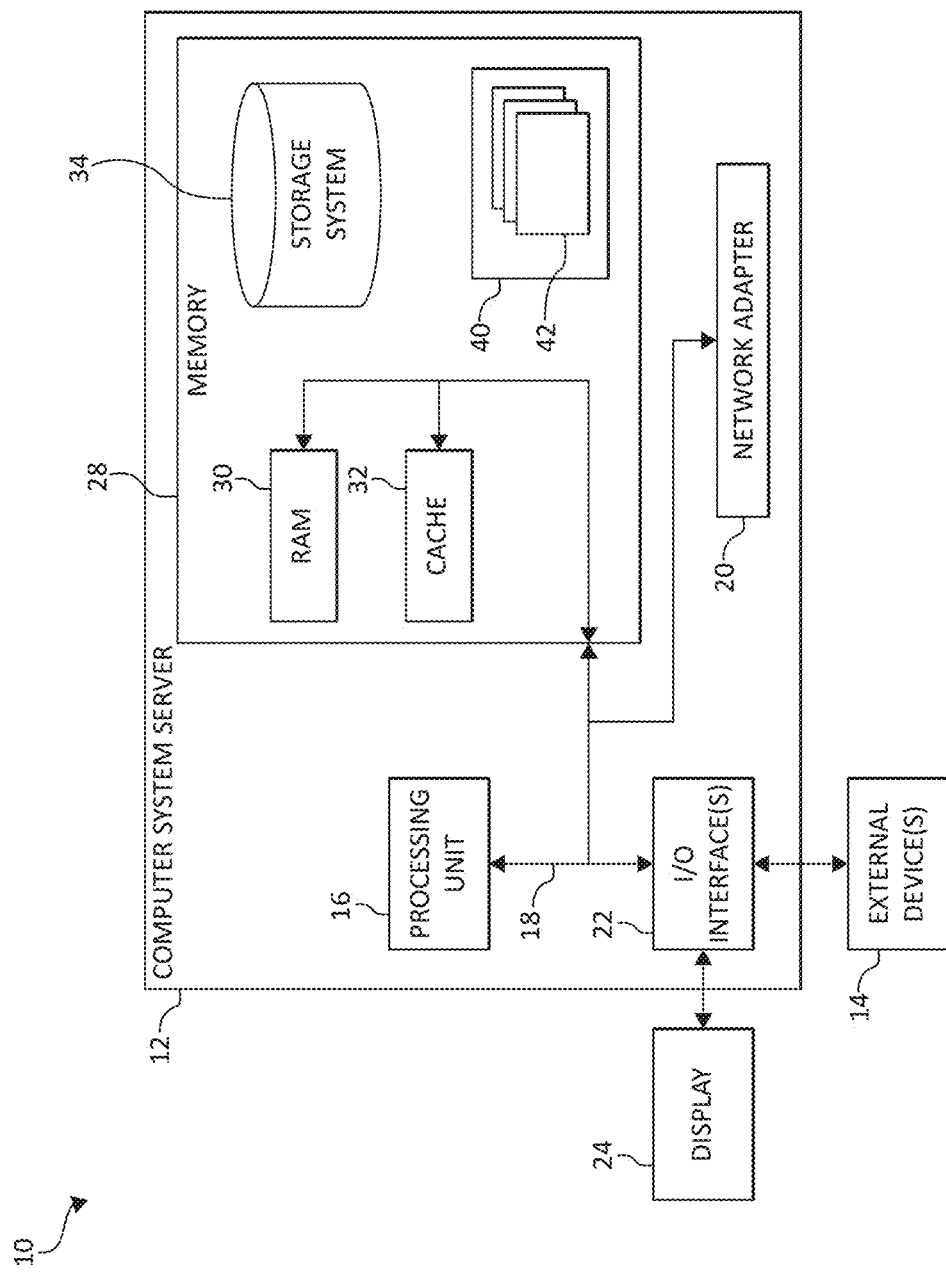
FIG. 1 is a block diagram depicting an exemplary cloud computing node according to an embodiment of the present invention.

In recent years, people have been witnessing a data explosion with data being estimated in the order of zettabytes. Analysing this wealth and volume of data offers remarkable opportunities for growth in various industries and sectors (of types of entities (e.g., companies, governments, academic institutions, organizations, etc.). However, the majority of these datasets (e.g., healthcare data, telecommunication data, banking data, etc.) are proprietary and many contain personal (e.g., personal identifiable information "PII"), sensitive personal Information ("SPI"), and/or business sensitive information. Examples of sensitive data include patient records, special housing information, tax records, governmental issued identification numbers (e.g., social security number), banking/financial data numbers (e.g., a bank account number, credit/debit card numbers, etc.), customer purchase records, academic records, mobile call detail records (CDR), etc. Moreover, depending on a specific region or jurisdiction, some types of data may be considered protected or "classified" while other data may be considered unprotected or "unclassified." The various types of data is often considered as private and confidential and should be protected from access by unauthorized users. Moreover, users/administrators, entities (e.g., businesses, institutions, organizations, etc.), regions, sovereignties, cultures, agencies, and/or government may also each define their own a set of criteria for classifying data, which may be similar, unique, or different from what others define for classifying data.

Data classification is what determines the subsequent actions that may be performed with the data such as, for example, securely storing or even sharing the data. Currently, however, the classification of data is performed after the data has been received in a computing system and then stored in database, which may lead to inaccuracies, computing inefficiencies, and may even lead to inappropriate disclosure of otherwise protected data released or disclosed prior to classification. Accordingly, a need exists to detect and classify data based on contextual information in real-time upon immediately receiving the data (e.g., classifying the data in real-time).

Thus, the present invention preserves and maintains data security in a computing system. Data may be received from a user. For example, the present invention protects personal, sensitive, and/or proprietary information by inspecting data upon receiving the data. Contextual information may be learned from the data received from a user using a machine learning operation. The data may be classified according to the contextual classification criteria applied to contextual information derived in real time from the data. In one aspect, data may be received as an input. The data may be received from a user. User may be a user of the system such as for example, a human, a computing system; a robot, and application programming interface ("API"), files and/or an input from one or more sources.

In an additional aspect, the classification of data is derived in real time from the context and context based criteria. For example, when user enters data into a computing system, the context for the data is happens/occurs in real time and analyzed against context based classification criteria. Various contextual classification criteria may be applied real time in deriving the data classification. Using Artificial Intelligence ("AI") and/or natural language processing ("NLP"), the type of data and its classification may be identified such as, for example PII or SPI from unstructured data from various interactions with applications and tools performed by the user. That is, a machine learning operation may perform one or more machine learning operations (e.g., natural language processing and/or artificial intelligence "AI" operations) to learn both the contextual information and application classification criteria required to be applied to data for appropriate classification (e.g., private, personal, sensitive, and/or proprietary).

In one aspect, the AI may be used for real time recognition of the PII data. The PII data may also generate or follow a particular data pattern, which may be recognized or identified with an NLP operation. For example, when a user enters data (e.g., data relating to nationality), the user may be identified as from a particular region or jurisdiction (e.g., country "A"). The context may then be identified, learned, processed, and/or built as user data from country "A" and may then apply country "A" data laws, rules, regulations, policies, etc. Since, data relating to nationality may be considered as PII data in country "A", the data may fall under personal identifiable information "PII" classification.

Thus, the present invention leverages data type identification operations to ensure required security guarantees are maintained and ensured. In one aspect, mechanisms of the illustrated embodiments may inspect the data prior to being committed to storage (e.g., local storage and/or remote storage) to ensure that no classified information (e.g., personal information, personal health information and/or any other sensitive information which may be herein referred to as "classified data") is released (e.g., leaked).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
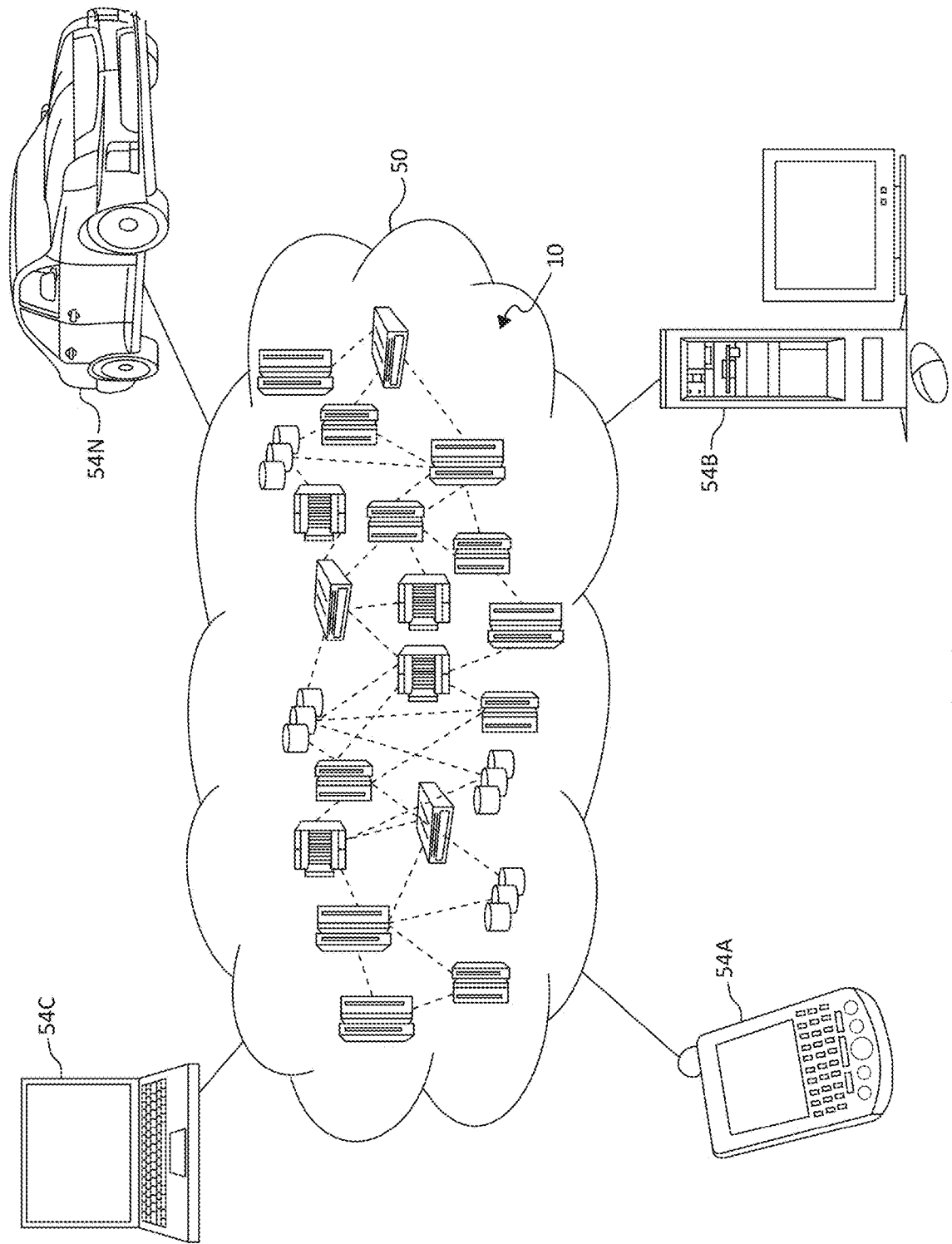
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
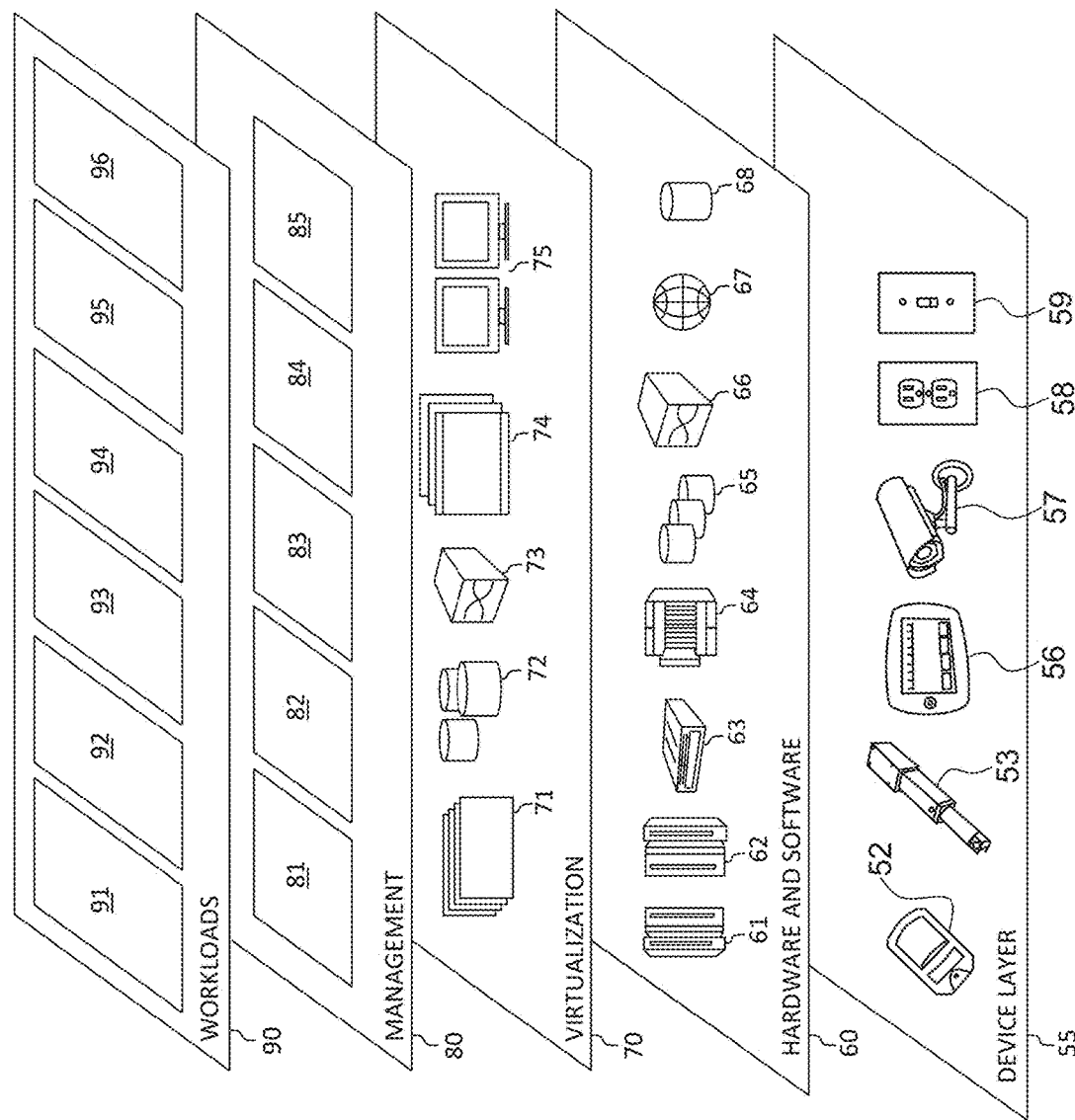
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for preserving data security. In addition, workloads and functions 96 for preserving data security may include such operations as data analysis (including data collection and processing) and data analytics functions. One of ordinary skill in the art will appreciate that the workloads and functions 96 for preserving data security may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for real time context-based detection of data classification in a computing system.

In one aspect, the present invention may receive, interrupt, and/or intercept and act upon data prior to reaching a computing storage system/device. In one aspect, the data is analyzed and contextual information is collected learned, identified, processed, assembled, and/or built. For example, when a user enters data, collection of context may start immediately in real time.

Once enough context data is accumulated/built, the contextual information may be analyzed to determine the correct classification criteria to be applied (e.g., classifying the data as PII, SPI, classified, unclassified, etc., based on the identified/learned context). Once the classification criteria for classified data is applied, and determined to be protected and/or classified, the present invention further applies the classification criteria to classify data with enhanced classification (e.g., top-level classification or security). Thus, in one aspect, data may be first classified at a first tier level of classification criteria such as, for example, data may be classified as PII or SPI. A second or "nth" tier level of classification criteria may also be applied such as, for example, the PII data of the first tier may also be classified according to the second or "nth" tier level such as, for example, the PII data is also "classified" or "confidential" according to certain laws, regulations, rules, or policies of country "A." Alternatively, the data may be past the first tier level of classification (e.g., not considered as confidential), but may be considered as "classified" according to certain laws, regulations, rules, or policies of country "A" based on the second or "nth" tier level of classification criteria. Thus, the learned contextual information may be used to apply the various context-based classification criteria based on the particular context.

Figure 4:
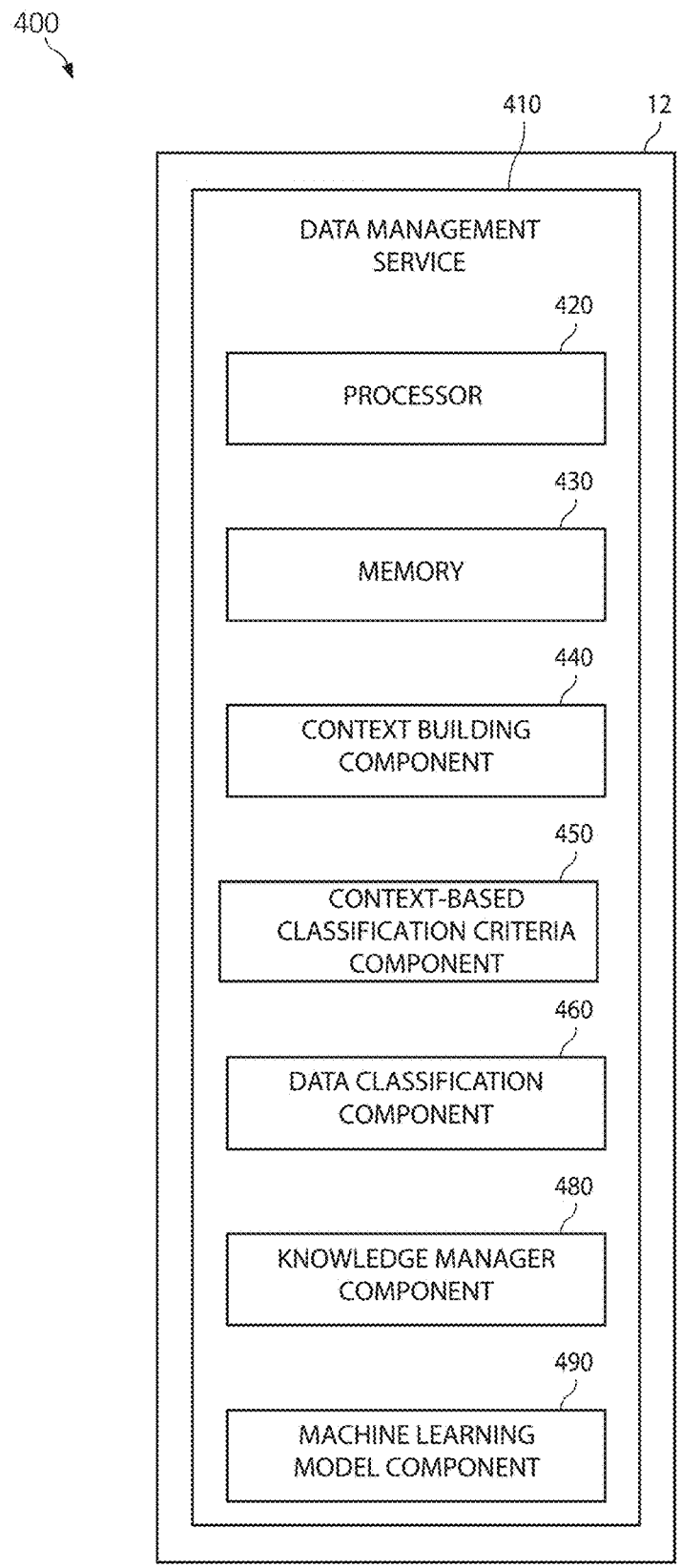
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments is shown for preserving data security in a computing system. In one aspect, one or more of the components, modules, services, applications, and/or functions described in FIGS. 1-3 may be used in FIG. 4.

A data management service 410 is shown, incorporating processing unit 420 to perform various computational, data processing and other functionality in accordance with various aspects of the present invention. The data management service 410 may be included in computer system/server 12, as described in FIG. 1. The processing unit 420 ("processor") may be in communication with memory 430.

The data management service 410 may also include a context building component 440, a context-based classification criteria component 450 (e.g., contextual classification criteria), a data classification component 460, knowledge manager component 480, and a machine learning component 490, each of which may be in communication with each other.

In one aspect, data management service 410 may in communication with and/or associated with one or more databases such as, for example, storage system 34 of FIG. 1, which may be internal to the data management service 410 or may be external to the data management service 410. For example, the storage system 34 of FIG. 1 may be a third-party database in communication with and/or associated with the data management service 410.

As one of ordinary skill in the art will appreciate, the depiction of the various functional units in data management service 410 is for purposes of illustration, as the functional units may be located within the data management service 410 or elsewhere within and/or between distributed computing components.

Responsive to receiving data from a user and/or an enterprise, the data classification component 460 may determine and classify the data according to contextual classification criteria applied to contextual information derived in real time from the data.

The context building component 440, in association with the machine learning component 490, may learn the contextual information from the data received from a user using a machine learning operation. In one aspect, the data is structured data, unstructured data, or a combination thereof.

For example, the context building component 440 may identify, learn, and collect a name of the user (e.g., John Doe 1-4 and Jane Doe 1), financial data (e.g., credit card "CC" data), and personal identification data (e.g., a government issued identification such as, for example, a social security number "SSN").

The context-based classification criteria component 450 may define the contextual classification criteria to include one or more legal, ethical, moral, or jurisdictional data security policies, rules, regulations, or a combination thereof. Also, the context-based classification criteria component 450 may define the contextual classification criteria to include data security policies, rules, regulations, or a combination thereof relating to user criteria, data types and formats, data ownership, or a combination thereof. In one aspect, the context-based classification criteria component 450 may continuously search, receive, learn, alter, adjust, update, and/or modify the contextual classification criteria.

The data classification component 460 may, in association with the machine learning component 490, may analyze the contextual information to determine those of the contextual classification criteria applicable for classifying the data.

For example, the data classification component 460 may, in association with the machine learning component 490 may application the contextual classification criteria to identify and protect such sensitive, personal, or private information data. The data classification component 460 may, in association with the machine learning component 490 may also query the knowledge manager 480 about contextual information related to the data such as, for example, the personal identification data and/or the financial data. The data classification component 460 may, in association with the machine learning component 490, may apply the contextual classification criteria to the data to determine and verify such information qualified under one or more of the contextual classification criteria based on the contextual information (e.g., data determined to be "classified" by based on county "A's" or entity "B's" data classification policies, rules, and/or regulations).

The data classification component 460 may apply legal, ethical, moral, or jurisdictional ones of the contextual classification criteria in view of the contextual information for classifying data according to contextual classification criteria applied to contextual information.

In an additional aspect, the data classification component 460 may apply data security policies, rules, regulations, or a combination thereof relating to user criteria, data types and formats, data ownership, or a combination thereof for classifying data according to contextual classification criteria applied to contextual information.

The data classification component 460 verify the classified data is appropriately classified (e.g., confirming the classified data is correct/accurate) according to a selected combination of the contextual classification criteria based on the contextual information. The inaccurately or incorrectly classified data is reclassified based on one or more combinations of the contextual classification criteria.

The data classification component 460 may also be used to determine, confirm, re-classify, and/or transform (e.g., filter, anonymize, replace, data mask, etc.) the classified data based on the contextual information. The data classification component 460 may maintain the classified/private data (e.g., personal, sensitive, proprietary information) while maintaining and preserving the data/file format (e.g., preserve the data structure and size), which may be then be anonymized/filtered data. The data classification component 460 may provide a response back to a user indicating the results of the operations described herein.

The knowledge manager 480 (e.g., a knowledge base manager) is in charge of serving and providing in a distributed manner the following information. 1) The contextual classification criteria that may include, but not limited to, data security policies, rules, regulations, or a combination thereof relating to user characteristics, personal data (e.g., personal identifiable information "PII"), data types and formats, data ownership, and/or security policies, rules, regulations, or a combination thereof relating to legal, ethical, moral, or jurisdictional contextual classification criteria. The contextual classification criteria may be used for describing a type of classified/private data (e.g., personal, sensitive, proprietary information) that the system needs to protect. 2) A set of exceptions, i.e., cases in which the classified/private data (e.g., personal, sensitive, proprietary information) may be released. 3) A set of data enforcement/ security enforcement rules describing how to process each type of classified/private data (e.g., personal, sensitive, proprietary information).

For example, the context-based classification criteria component 450 may receive one or more instructions from the knowledge manager component 480 for applying the contextual classification criteria to contextual information extracted from data.

Alternatively, the context building component 440 may infer a context and/or format of the data/files from one or more operations such as, for example, inspecting the data, leveraging application related data (e.g., extension), and/or a best practice operation (e.g., format of log files. This information is then used to assist the context-based classification criteria component 450 to parse the data and identify the context of the data.

The machine learning component 490 may learn the various classified/private data (e.g., personal, sensitive, proprietary information) for each type of user and/or entity (e.g., government, business, organization, academic institution, etc.) and assist the knowledge manager 480 to identify, detect, analyze, and/or intercept classified/private data (e.g., personal or sensitive information), and/or data patterns to assist with learning the contextual information and/or classification. In one aspect, machine learning component 490 may include and/or access a knowledge domain that may include a variety of knowledge data such as, for example, data relating to the various classified/private data for each type of user and/or entity (e.g., government, business, organization, academic institution, etc.).

In one aspect, the various machine learning operations of the machine learning component 490, as described herein, may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

As one of ordinary skill in the art will appreciate, the data management service 410 may implement mathematical modeling, probability and statistical analysis or modeling, machine reasoning, probabilistic logic, text data compression, or other data processing technologies to carry out the various mechanisms of the illustrated embodiments. In one aspect, calculations may be performed using various mathematical operations or functions that may involve one or more mathematical operations (e.g., using addition, subtraction, division, multiplication, standard deviations, means, averages, percentages, statistical modeling using statistical distributions, by finding minimums, maximums or similar thresholds for combined variables, etc.).

In view of the foregoing, consider the following operation example illustrated in FIGS. 5A-5D and 6 of the implementation of the aforementioned functionality. Turning now to FIGS. 5A-5D, an exemplary operation for providing real-time context-based detection and classification of data is depicted, in which various aspects of the illustrated embodiments may be implemented. Also, one or more components, functionalities, and/or features of FIGS. 1-4 may be implemented in FIGS. 5A-5D and FIG. 6. Repetitive description of like elements, components, modules, services, applications, and/or functions employed in other embodiments described herein is omitted for sake of brevity.

As shown, the various blocks of functionality are depicted with arrows designating the blocks' 500 (and also blocks 525, 535, and 545) relationships with each other and to show process flow. Additionally, descriptive information is also seen relating each of the functional blocks 500. As will be seen, many of the functional blocks may also be considered "modules" of functionality, in the same descriptive sense as has been previously described in FIGS. 1-4. With the foregoing in mind, the module blocks 500 (also blocks 525, 535, and 545) may also be incorporated into various hardware and software components of a system for image enhancement in accordance with the present invention. Many of the functional blocks 500 (also blocks 525, 535, and 545) may execute as background processes on various components, either in distributed computing components, or on the user device, or elsewhere, and generally unaware to the user performing.

Starting in block 510, a user may enter data into a computing system. The data 512 may then be used to build contextual information from the data, as in block 520. The contextual information may include, but not limited to, information relating to location 524 (e.g., data is from country "A"), information relating to data ownership 526 (e.g., a location/company owning the application data), and/or user characteristics 528, which may all be collected and assembled into information relating to data classification 522 (e.g., PII, SPI, confidential, governmental "top secret", classified, unclassified, etc.), Contextual classification criteria (e.g., context-based data classification criteria) may be applied to the built contextual information, as in block 530. In block 538, a determination operation may be performed to confirm a data classification based on the contextual information. If no at block 538, the method 500 may move back to block 530. If yes, the method 500 may move back to block 540. The data classification (e.g., PII, SPI, confidential, top secret, classified) may be identified and confirmed, as in block 540. The method 500 may move to block 550 and end.

Figure 5A:
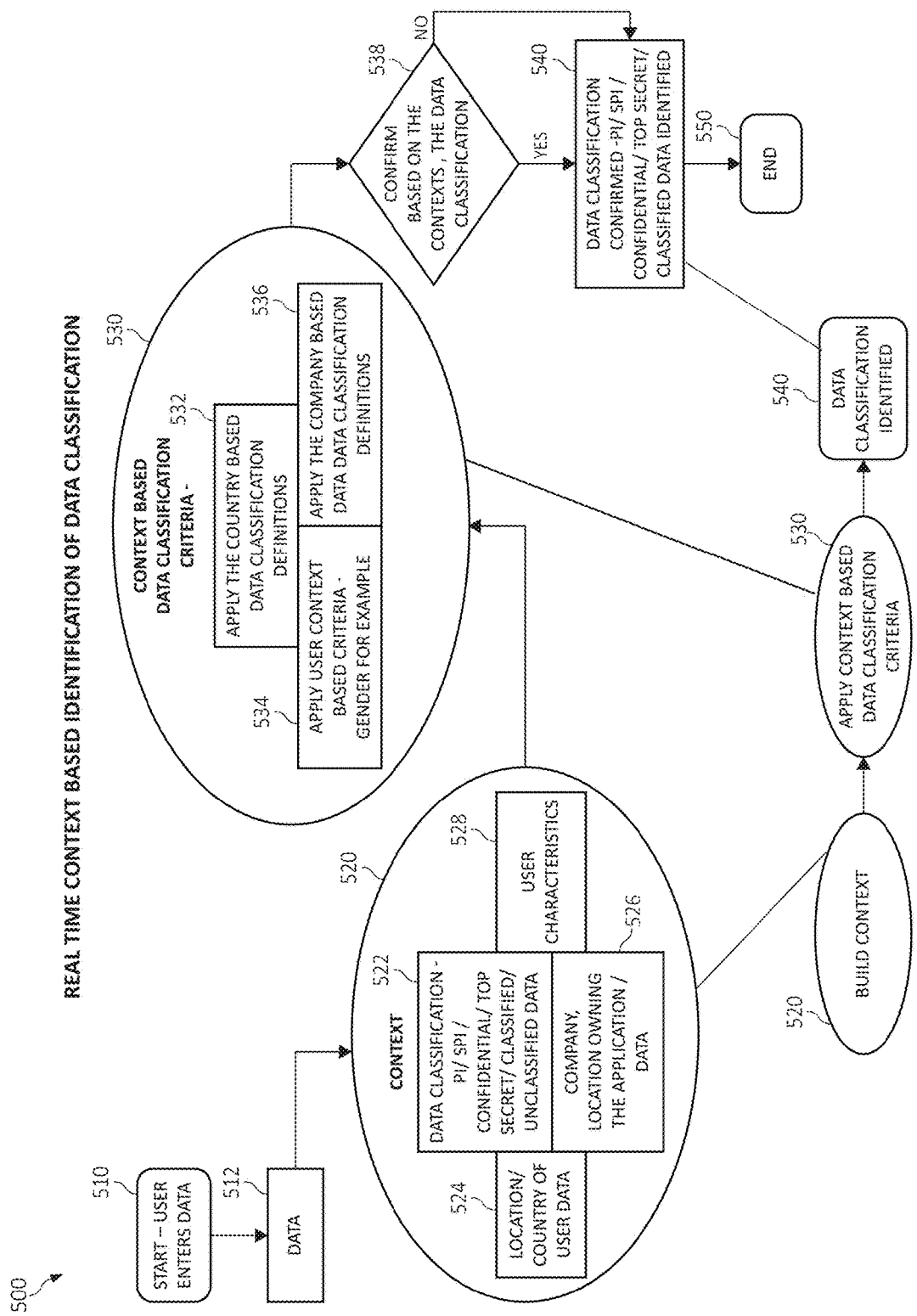
FIG. 5A-5D is a diagram depicting exemplary operations for providing real-time context-based detection and classification of data in accordance with aspects of the present invention.
Figure 5B:
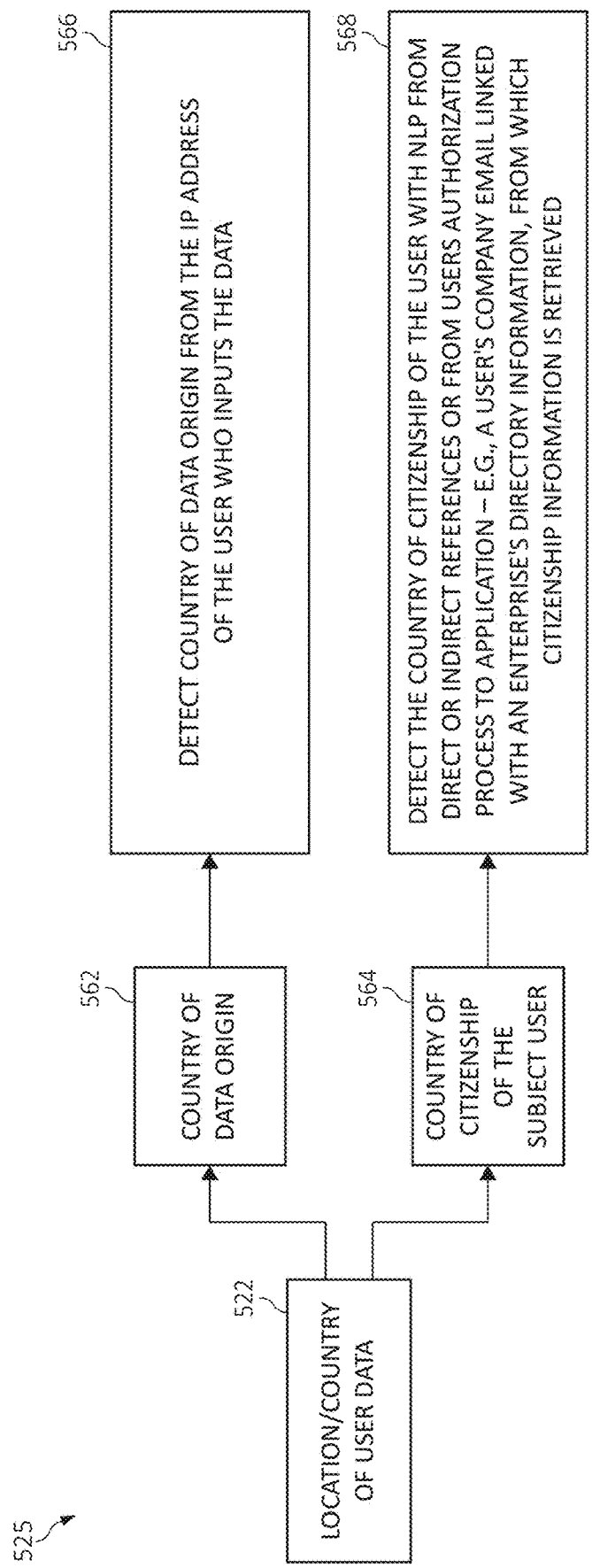

Turning now to FIG. 5B, operations for building contextual information (e.g., information relating to location 524) from the data, in block 520 of FIG. 5A is depicted. In blocks 562 and 566, the origin of a region, jurisdiction, government, sovereignty, or area (e.g., the country) of data may be identified and the data origin may be detected from data/metadata identified from interactions of a user with one or more computing systems/applications such as, for example, internet protocol "IP" address of a user entering the data. In blocks 564 and 568, an association and/or membership (e.g., citizenship) of a region, jurisdiction, government, sovereignty, or area (e.g., the country) may be identified with the "citizenship" data of the user being identified/detected using one or more machine learning operations (e.g., NLP) from direct and/or indirect references from a user's authorization process to an application (e.g., a company email of the user's may be lined with an entity's/enterprises directory information, from which the user's citizenship information may be learned, identified, accessed, and/or retrieved.

Figure 5C:
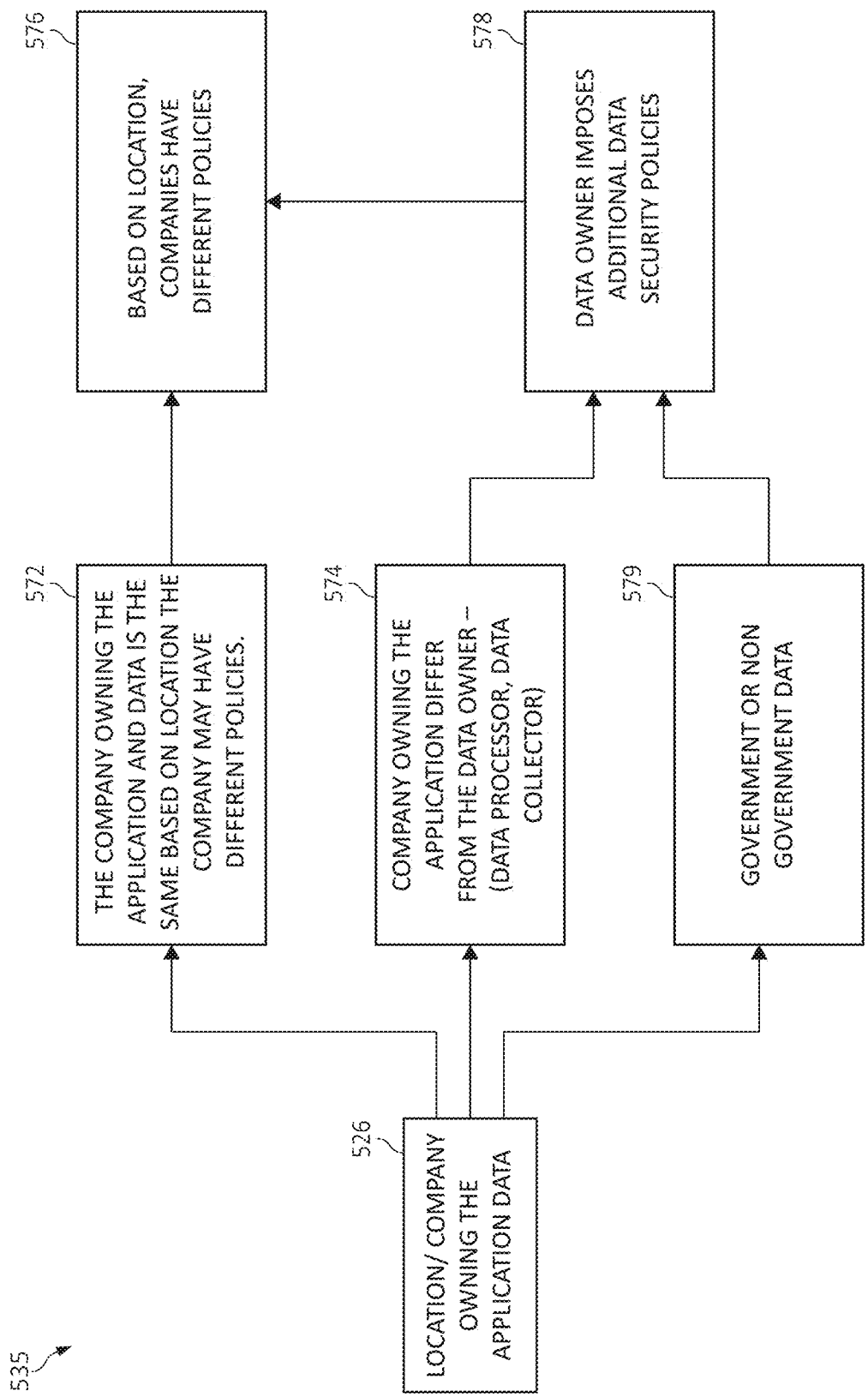

Turning now to FIG. 5C, operations for building contextual information (e.g., data ownership 526) from the data, in block 520 of FIG. 5A is depicted. In blocks 527 and 576, the entity (e.g., company) owning a particular application and the data may be identified and be the same, which may also be based on the location of the company which may have similar and/or different contextual classification criteria. In block 574, 578, and 576, the entity (e.g., company) owning a particular application may be different from the owner of the data (e.g., data processor, data collector, etc.), where both the application owner and the data owner may have different contextual classification criteria, which may also be based on the location of the company which may have similar and/or different contextual classification criteria.

Similar to blocks 574, 578, and 576, the entity owning a particular application and the data may be identified as a government and/or non-government entity, as in block 579, and then moving to blocks 578 and 576.

Figure 5D:
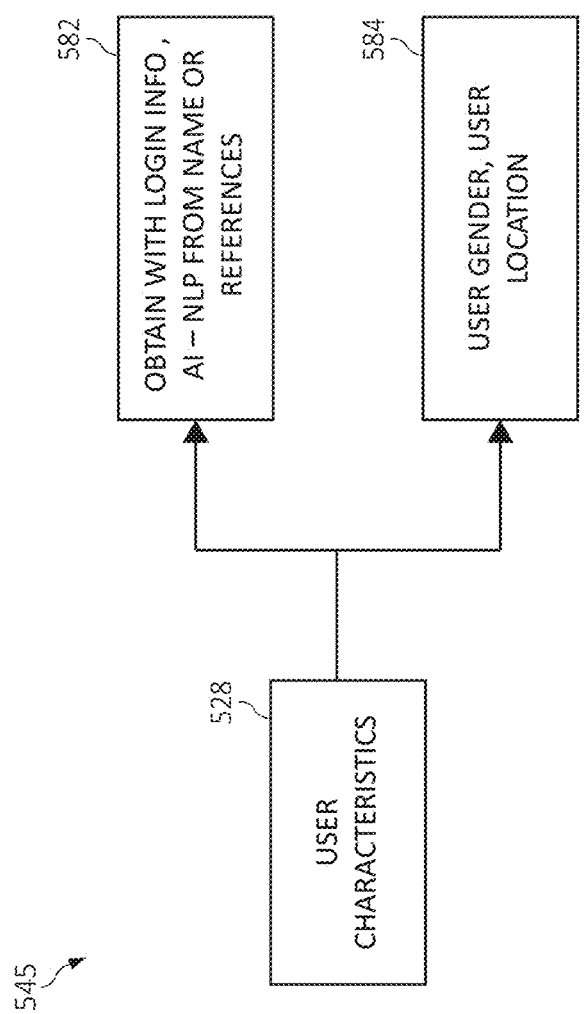

Turning now to FIG. 5D, operations for building contextual information (e.g., user characteristics 528) from the data, in block 520 of FIG. 5A is depicted. In blocks 582, one or more characteristics of the user may be obtained from various interactions of a user with one or more computing systems/applications such as, for example, login information, and/or name and/or references obtained/learned from one or more machine learning operations (e.g., AI and/or NLP). In block 584, the user's gender and/or location may be located, identified, obtained, and/or verified.

Figure 6:
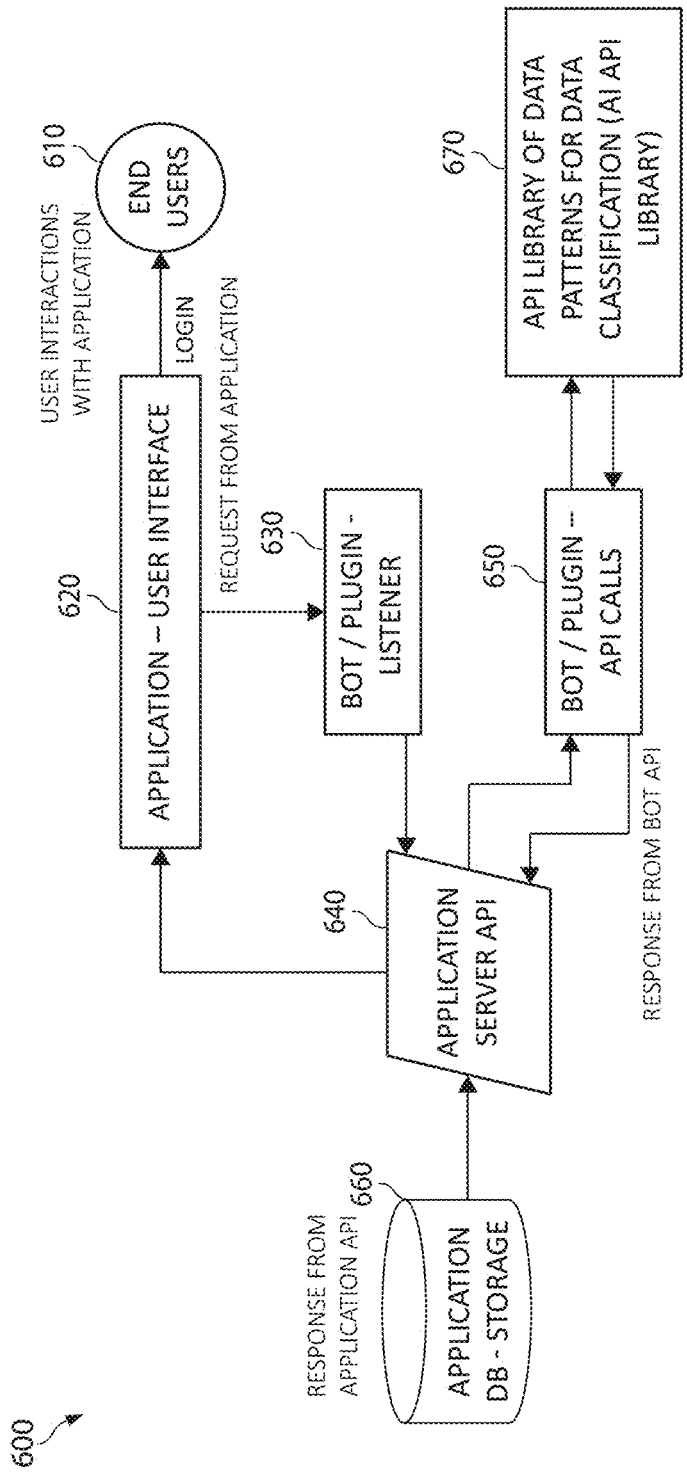
FIG. 6 is a diagram depicting exemplary operations for providing real-time context-based detection and classification of data in accordance with aspects of the present invention.

Turning now to FIG. 6, an exemplary operation for exemplary implementation for providing real-time context-based detection and classification of data is depicted. Also, one or more components, functionalities, and/or features of FIGS. 1-5A-5D may be implemented in FIG. 6. Similar to FIG. 5, the various blocks of functionality of FIG. 6 are depicted with arrows designating the blocks' 600 relationships with each other and to show process flow. Repetitive description of like elements, components, modules, services, applications, and/or functions employed in other embodiments described herein is omitted for sake of brevity.

In one aspect, a user 610 (e.g., one or more end users) may login to a system and/or input data into a computing system by interacting with an application via a user interface, as in block 620. A bot/plugin-listener may receive and/or request the data from the application, as in block 630.

An application service application programming interface ("API") may also receive the request, as in block 640, and then query an application database ("DB") storage system, as in block 660. The data received from the application DB storage system may be forward along with the request, from block 620, to a bot/plugin API calls, as in block 650. A machine learning operation system (e.g., IBM® Watson® library) may process the data received from block 670. In one aspect, the machine learning operation system may learn the contextual information from the data received from the user 610. Also, the machine learning operation system may analyze the contextual information to determine those of the contextual classification criteria applicable for classifying the data and then classify data according to contextual classification criteria applied to contextual information derived in real time from the data.

The machine learning operation system (e.g., AI library/system), at block 670, may then return the processed, classified data response back to the user 610 via the bot/plugin API calls, as in block 650, and back through the application server API, as in block 640, which then forwards the reply back to the application via the user interface for communicating the response to the user 610, as in block 620. For example, the response from the machine learning operation system may be, for example, the data you provided is John Doe (e.g., not classified or does not qualify under the contextual classification criteria) with personal data (e.g., personal identification information "PII") indicated by "********" (e.g., PII data is masked since it is protected/classified), and gender data shown as "****" (e.g., gender data is also considered as private, classified, and/or protected according to the contextual classification criteria such as, for example, contextual classification criteria from country "A").

Figure 7:
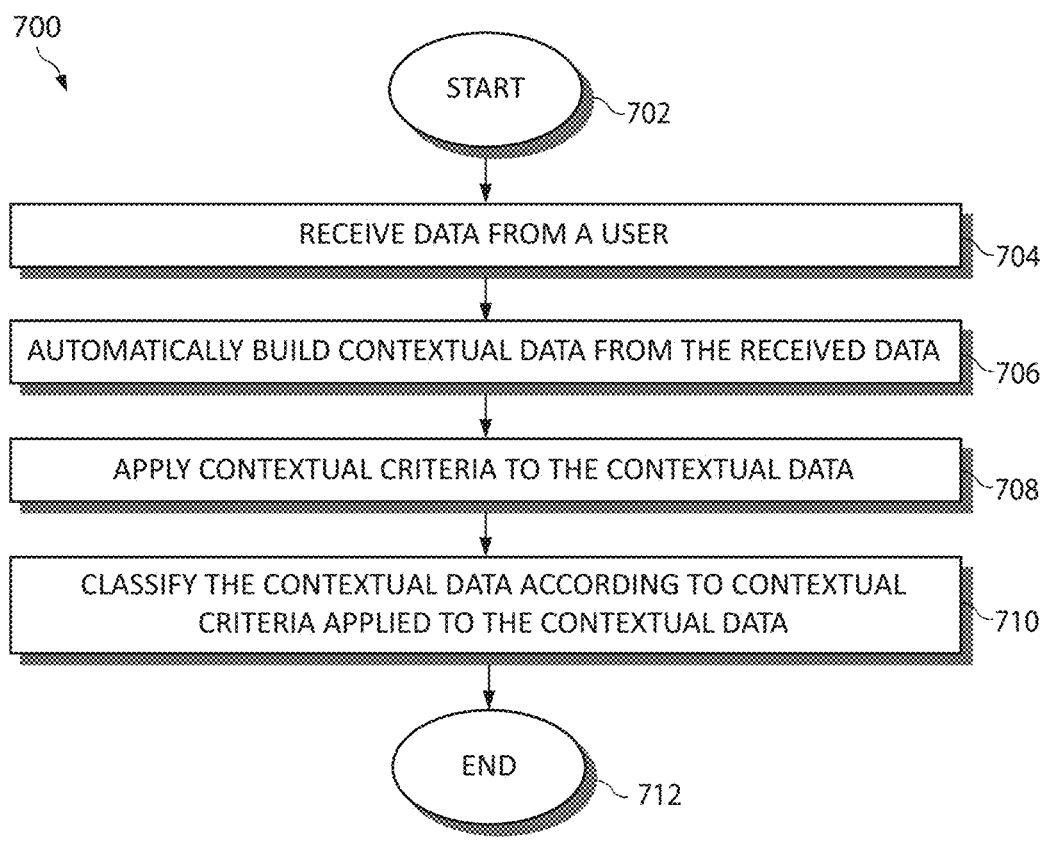
FIG. 7 is a flowchart diagram depicting an exemplary method for providing real-time context-based detection and classification of data in a computing environment in which aspects of the present invention may be realized.

Turning now to FIG. 7, a method 700 for providing real-time context-based detection and classification of data in a computing environment is depicted, in which various aspects of the illustrated embodiments may be implemented. The functionality 700 may be implemented as a method executed as instructions on a machine, where the instructions are included on at least one computer readable storage medium or one non-transitory machine-readable storage medium. The functionality 700 may start in block 702.

Data may be received from a user, as in block 704. Contextual information may be automatically built (e.g., analyzed, extracted, and/or generate) from the data received from the user using a machine learning operation, as in block 706. The data may be structured data, unstructured data, or a combination thereof. The contextual criteria may be applied to the contextual data, as in block 708. The data may be classified according to the contextual classification criteria applied to contextual information derived in real time from the data, as in block 710. The functionality 700 may end in block 712.

Figure 8:
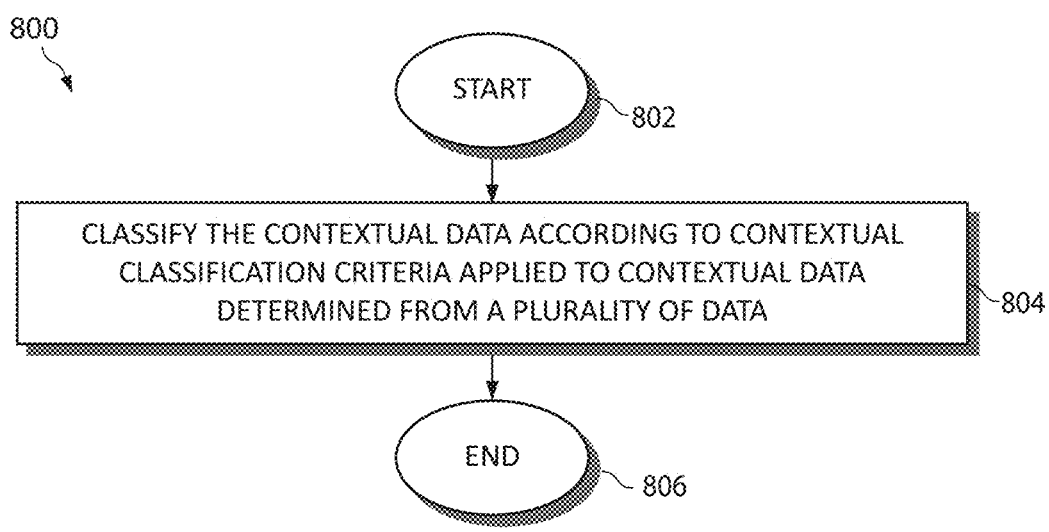
FIG. 8 is a flowchart diagram depicting an exemplary method for providing real-time context-based detection and classification of data in a computing environment in which aspects of the present invention may be realized.

Turning now to FIG. 8, an additional method 800 for providing real-time context-based detection and classification of data in a computing environment is depicted, in which various aspects of the illustrated embodiments may be implemented. The functionality 800 may be implemented as a method executed as instructions on a machine, where the instructions are included on at least one computer readable storage medium or one non-transitory machine-readable storage medium. The functionality 00 may start in block 802.

Data may be classified and detected according to contextual classification criteria applied to contextual information derived in real time from the data, as in block 804. The functionality 800 may end in block 06.

In one aspect, in conjunction with and/or as part of at least one block of FIGS. 7-8, the operations of 700 and/or 800 may include one or more of each of the following. The operations of 700 and/or 800 may receive, intercept and/or inspect selected data from one or more users. The operations of 700 and/or 800 learn the contextual information from the data received from a user using a machine learning operation, wherein the data is structured data, unstructured data, or a combination thereof. The operations of 700 and/or 800 may analyze the contextual information to determine those of the contextual classification criteria applicable for classifying the data.

The operations of 700 and/or 800 apply legal, ethical, moral, or jurisdictional ones of the contextual classification criteria in view of the contextual information for classifying data according to contextual classification criteria applied to contextual information, and/or apply data security policies, rules, regulations, or a combination thereof relating to user criteria, data types and formats, data ownership, or a combination thereof for classifying data according to contextual classification criteria applied to contextual information.

The operations of 700 and/or 800 may define the contextual classification criteria to include one or more legal, ethical, moral, or jurisdictional data security policies, rules, regulations, or a combination thereof, and/or define the contextual classification criteria to include data security policies, rules, regulations, or a combination thereof relating to user criteria, data types and formats, data ownership, or a combination thereof.

The operations of 700 and/or 800 may verify the classified data is appropriately classified according to a selected combination of the contextual classification criteria based on the contextual information, wherein in appropriately classified data is reclassified based on one or more combinations of the contextual classification criteria.

The operations of 700 and/or 800 may replace the selected data with anonymized data according to the one or more data security policies or rules, and/or filter the selected data relating to the write operation or the read operation according to the one or more data security policies or rules.

The operations of 700 and/or 800 may define the one or more data security policies or rules to include types and formats of data for preserving data security, define the one or more data security policies or rules to one or more operations to perform for preserving data security, and/or apply the one or more data security policies or rules to the write operation or the read operation using a machine learning operation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for providing real-time data classification in a computing environment, comprising:
    deriving contextual information from data, in real-time as the data is received, by identifying a plurality of characteristics of the data, wherein:
        identifying a first of the plurality of characteristics comprises examining geographical information of a location from which the data is being input irrespective of whether the geographical location information is explicitly referenced in content of the data itself, and comparing the geographical information to a determined citizenship of a user inputting the data,
        identifying a second of the plurality of characteristics comprises identifying an entity owning the data, and
        identifying a third of the plurality of characteristics comprises identifying user characteristics of the user inputting the data; and
    classifying the data according to contextual classification criteria applied to the contextual information derived in real time from the data.

2. The method of claim 1, further including learning the contextual information from the data received from a user using a machine learning operation, wherein the data is structured data, unstructured data, or a combination thereof.

3. The method of claim 1, further including analyzing the contextual information to determine those of the contextual classification criteria applicable for classifying the data.

4. The method of claim 1, wherein classifying data according to contextual classification criteria applied to contextual information further includes applying legal, ethical, moral, or jurisdictional ones of the contextual classification criteria in view of the contextual information.

5. The method of claim 1, wherein classifying data according to contextual classification criteria applied to contextual information further includes applying data security policies, rules, regulations, or a combination thereof relating to user criteria, data types and formats, data ownership, or a combination thereof.

6. The method of claim 1, further including:
    defining the contextual classification criteria to include one or more legal, ethical, moral, or jurisdictional data security policies, rules, regulations, or a combination thereof; or
    defining the contextual classification criteria to include data security policies, rules, regulations, or a combination thereof relating to user criteria, data types and formats, data ownership, or a combination thereof.

7. The method of claim 1, further including verifying the classified data is appropriately classified according to a selected combination of the contextual classification criteria based on the contextual information, wherein inappropriately classified data is reclassified based on one or more combinations of the contextual classification criteria.

8. A system providing real-time data classification in a computing environment, comprising:
    one or more computers with executable instructions that when executed cause the system to:
        derive contextual information from data, in real-time as the data is received, by identifying a plurality of characteristics of the data, wherein:
            identifying a first of the plurality of characteristics comprises examining geographical information of a location from which the data is being input irrespective of whether the geographical location information is explicitly referenced in content of the data itself, and comparing the geographical information to a determined citizenship of a user inputting the data,
            identifying a second of the plurality of characteristics comprises identifying an entity owning the data, and
            identifying a third of the plurality of characteristics comprises identifying user characteristics of the user inputting the data; and
        classify the data according to contextual classification criteria applied to the contextual information derived in real time from the data.

9. The system of claim 8, wherein the executable instructions learn the contextual information from the data received from a user using a machine learning operation, wherein the data is structured data, unstructured data, or a combination thereof.

10. The system of claim 8, wherein the executable instructions analyze the contextual information to determine those of the contextual classification criteria applicable for classifying the data.

11. The system of claim 8, wherein the executable instructions apply legal, ethical, moral, or jurisdictional ones of the contextual classification criteria in view of the contextual information for classifying data according to contextual classification criteria applied to contextual information.

12. The system of claim 8, wherein the executable instructions apply data security policies, rules, regulations, or a combination thereof relating to user criteria, data types and formats, data ownership, or a combination thereof for classifying data according to contextual classification criteria applied to contextual information.

13. The system of claim 8, wherein the executable instructions:
define the contextual classification criteria to include one or more legal, ethical, moral, or jurisdictional data security policies, rules, regulations, or a combination thereof; or
define the contextual classification criteria to include data security policies, rules, regulations, or a combination thereof relating to user criteria, data types and formats, data ownership, or a combination thereof.

14. The system of claim 8, wherein the executable instructions verify the classified data is appropriately classified according to a selected combination of the contextual classification criteria based on the contextual information, wherein inappropriately classified data is reclassified based on one or more combinations of the contextual classification criteria.

15. A computer program product for, by a processor, providing real-time data classification in a computing environment, the computer program product comprising a non-transitory computer-readable storage medium having computer-readable program code portions stored therein, the computer-readable program code portions comprising:
an executable portion that derives contextual information from data, in real-time as the data is received, by identifying a plurality of characteristics of the data, wherein:
identifying a first of the plurality of characteristics comprises examining geographical information of a location from which the data is being input irrespective of whether the geographical location information is explicitly referenced in content of the data itself, and comparing the geographical information to a determined citizenship of a user inputting the data,
identifying a second of the plurality of characteristics comprises identifying an entity owning the data, and
identifying a third of the plurality of characteristics comprises identifying user characteristics of the user inputting the data; and
an executable portion that classifies the data according to contextual classification criteria applied to the contextual information derived in real time from the data.

16. The computer program product of claim 15, further including an executable portion that learns the contextual information from the data received from a user using a machine learning operation, wherein the data is structured data, unstructured data, or a combination thereof.

17. The computer program product of claim 15, further including an executable portion that analyzes the contextual information to determine those of the contextual classification criteria applicable for classifying the data.

18. The computer program product of claim 15, further including an executable portion that:
applies legal, ethical, moral, or jurisdictional ones of the contextual classification criteria in view of the contextual information for classifying data according to contextual classification criteria applied to contextual information; or
applies data security policies, rules, regulations, or a combination thereof relating to user criteria, data types and formats, data ownership, or a combination thereof for classifying data according to contextual classification criteria applied to contextual information.

19. The computer program product of claim 15, further including an executable portion that:
defines the contextual classification criteria to include one or more legal, ethical, moral, or jurisdictional data security policies, rules, regulations, or a combination thereof; or
defines the contextual classification criteria to include data security policies, rules, regulations, or a combination thereof relating to user criteria, data types and formats, data ownership, or a combination thereof.

20. The computer program product of claim 15, further including an executable portion that verifies the classified data is appropriately classified according to a selected combination of the contextual classification criteria based on the contextual information, wherein inappropriately classified data is reclassified based on one or more combinations of the contextual classification criteria.

* * * * *